(12) United States Patent
King

(10) Patent No.: US 7,255,094 B2
(45) Date of Patent: Aug. 14, 2007

(54) FUEL VAPOR RECOVERY CANISTER

(75) Inventor: Timothy James King, Connersville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 11/624,063

(22) Filed: Jan. 17, 2007

(65) Prior Publication Data

US 2007/0119426 A1 May 31, 2007

Related U.S. Application Data

(63) Continuation of application No. 11/202,966, filed on Aug. 12, 2005.

(51) Int. Cl.
*F02M 55/02* (2006.01)

(52) U.S. Cl. .................... 123/519; 123/520

(58) Field of Classification Search ........ 123/516–520
See application file for complete search history.

(56) References Cited

U.S. PATENT DOCUMENTS

| | | | |
|---|---|---|---|
| 4,986,840 A * | 1/1991 | Mori et al. ............... 96/137 |
| 5,098,453 A | 3/1992 | Turner et al. |
| 5,477,836 A * | 12/1995 | Hyodo et al. ............ 123/519 |
| 5,564,398 A | 10/1996 | Maeda et al. |
| 5,632,808 A | 5/1997 | Hara et al. |
| 5,641,344 A | 6/1997 | Takahashi et al. |
| 5,645,036 A | 7/1997 | Matsumoto et al. |
| 5,718,209 A | 2/1998 | Scardino et al. |
| 5,743,943 A | 4/1998 | Maeda et al. |
| 5,957,114 A * | 9/1999 | Johnson et al. ............ 123/519 |
| 6,136,075 A | 10/2000 | Bragg et al. |
| 6,237,574 B1 * | 5/2001 | Jamrog et al. ............ 123/519 |
| 6,390,073 B1 | 5/2002 | Meiller et al. |
| 6,505,641 B1 | 1/2003 | Gerbert et al. |
| 6,772,741 B1 | 8/2004 | Pittel et al. |
| 6,928,990 B2 * | 8/2005 | Meiller et al. ............ 123/519 |
| RE38,844 E | 10/2005 | Hiltzik et al. |
| 7,097,697 B2 | 8/2006 | Nakamura et al. |
| 7,118,716 B2 * | 10/2006 | Meiller et al. ............ 422/180 |
| 2005/0172938 A1 | 8/2005 | Uchino et al. |
| 2005/0188851 A1 | 9/2005 | Yamazaki et al. |
| 2005/0223900 A1 | 10/2005 | Yoshida et al. |
| 2006/0102158 A1 | 5/2006 | Cairns et al. |
| 2006/0144228 A1 | 7/2006 | Reiners et al. |

OTHER PUBLICATIONS

Temperature and RVP Effects on Diurnal Emissions for Nonroad Engine Modeling, Report No. NR-001, Craig Harvey, U.S. EPA Office of Mobile Sources, Assessment and Modeling Division, Nov. 12, 1997, seven pages.

* cited by examiner

*Primary Examiner*—Thomas Moulis
(74) *Attorney, Agent, or Firm*—Barnes & Thornburg LLP

(57) ABSTRACT

A vehicle fuel system includes a fuel vapor recovery canister containing a carbon bed configured to capture hydrocarbon material associated with fuel vapor discharged from the fuel tank into the canister. A purge vacuum is applied to the canister to draw fuel vapor carrying reclaimed hydrocarbon material from the canister into an intake manifold coupled to an engine so that the reclaimed hydrocarbon material can be burned in the engine.

17 Claims, 5 Drawing Sheets

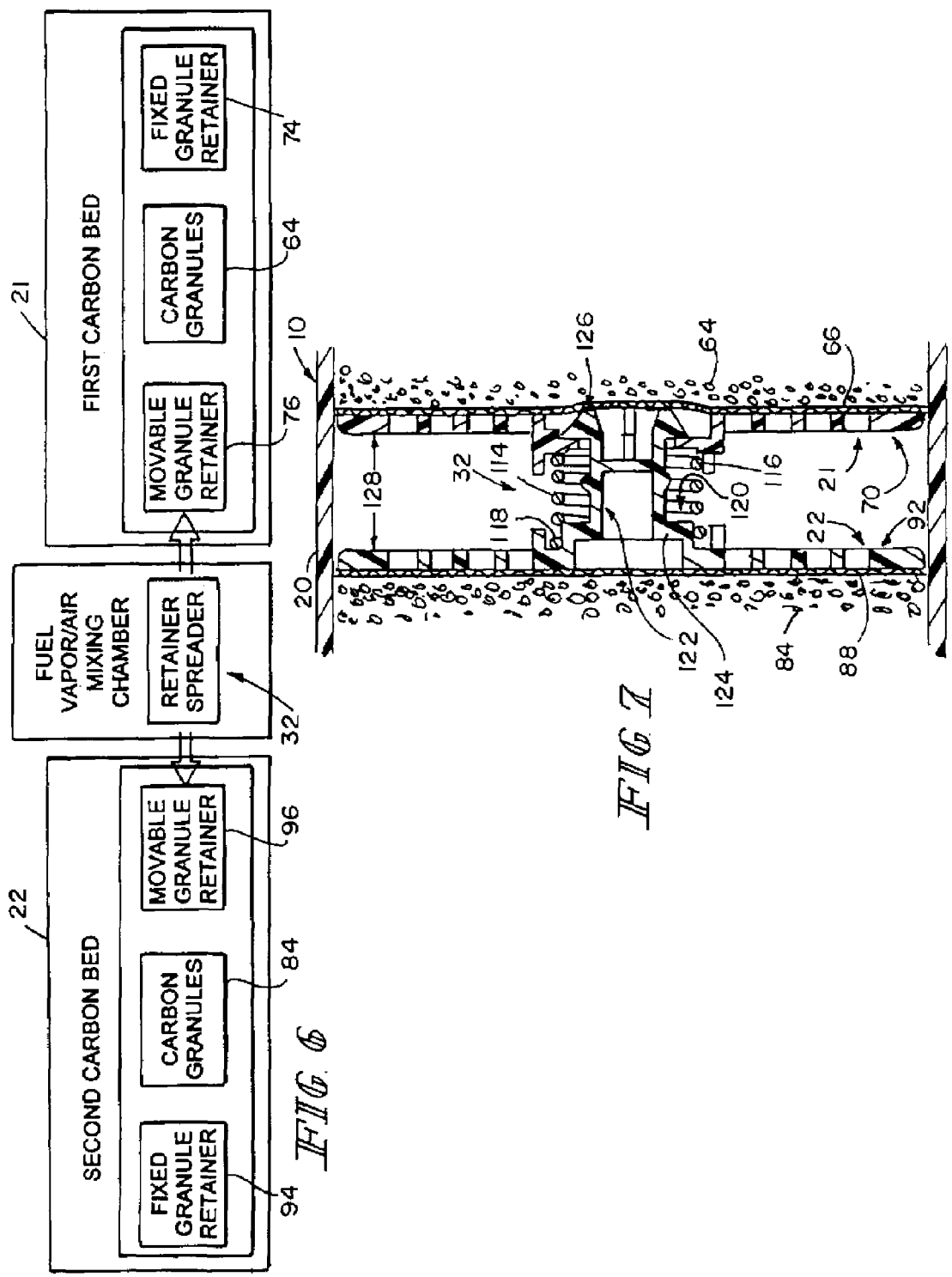

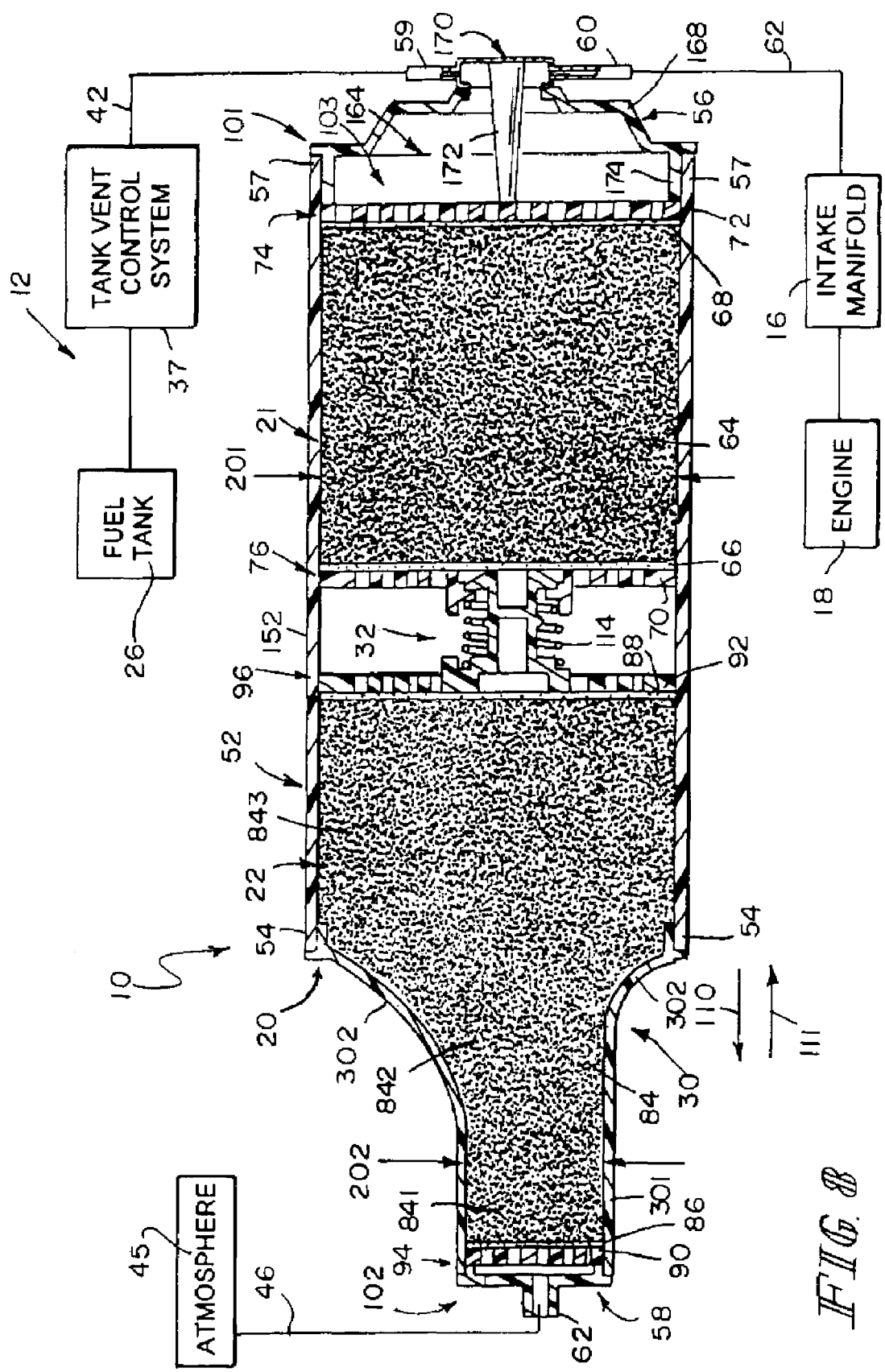

FUEL VAPOR RECOVERY CANISTER

This application is a continuation of prior application Ser. No. 11/202,966 filed Aug. 12, 2005.

BACKGROUND

The present disclosure relates to a vehicle fuel system, and particularly to a fuel vapor venting system associated with a vehicle fuel tank. More particularly, the present disclosure relates to a fuel vapor recovery canister included in a fuel vapor venting system.

Vehicle fuel systems include valves associated with a fuel tank and configured to vent pressurized or displaced fuel vapor from the vapor space in the fuel tank to a separate charcoal canister. The canister is designed to capture and store hydrocarbons entrained in fuel vapors that are displaced and generated in the fuel tank.

When a vehicle engine is running, a purge vacuum is applied to the charcoal canister via the engine intake manifold. Hydrocarbons stored (e.g., adsorbed) on charcoal held in the canister is entrained into a stream of atmospheric air drawn into the canister by the purge vacuum. This produces a stream of fuel vapor laden with "reclaimed" hydrocarbon material that is discharged from the canister through a purge hose into the intake manifold for combustion in the engine.

SUMMARY

A canister system in accordance with the present disclosure includes first and second carbon beds located in spaced-apart relation to one another in a housing. A fuel vapor/air mixing chamber is provided between the first and second carbon beds. During refueling, fuel vapor vented from a fuel tank included in the canister system is discharged into the housing to flow in sequence through both of the carbon beds to cause hydrocarbons associated with the vented fuel vapor to be captured by the beds and a stream of "cleaned" vapor to be discharged to the atmosphere.

In illustrative embodiments, the first carbon bed and at least a portion of the second carbon bed are located in a straight tube included in the housing. A portion of the second carbon bed is located in a funnel included in the housing and coupled to the straight tube. A high-speed flow pipe included in the funnel contains some of the carbon granules included in the second carbon bed and a horn-shaped transition pipe in the funnel is coupled to the straight tube.

When an engine associated with the canister system is running, a purge vacuum is applied to the interior region of the housing via an engine intake manifold to cause a stream of fuel vapor to flow through the tube at a first velocity and through the high-speed flow pipe at a higher velocity. This fuel vapor stream "picks up" hydrocarbons captured by the carbon beds and carries them through the intake manifold to be burned in the engine.

In illustrative embodiments, a spreader is provided to compact carbon granules in each carbon bed to assume the same density. Also, the canister is sized to be located in an exterior canister-receiving cavity formed in the fuel tank.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 6 is a diagrammatic view of a fuel vapor recovery canister in accordance with the present disclosure showing a carbon granule retainer system using a retainer spreader to urge (1) a first movable granule retainer in a first direction toward a first fixed granule retainer to compact a first group of carbon granules located therebetween to assume a selected granule density and form a first carbon bed and (2) a second movable granule retainer in an opposite second direction toward a second fixed granule retainer to compact a second group of carbon granules located therebetween to assume a selected granule density (illustratively, about equal to the selected granule density in the first carbon bed) and form a separate second carbon bed and showing location of the retainer spreader illustratively in a fuel vapor/air mixing chamber interposed between the first and second carbon beds;

FIG. 7 is a sectional view of an illustrative retainer spreader of the type shown diagrammatically in FIG. 6; and FIG. 8 is a sectional view taken along line 8-8 of FIG. 2 showing a first carbon bed in a right side of the canister, a second carbon bed in a left side of the canister, a retainer spreader spring located in a fuel vapor/air mixing chamber provided between the first and second carbon beds, and a flow velocity increaser provided by the funnel coupled to the left end of a tube containing the first carbon bed and a portion of the second carbon bed.

DETAILED DESCRIPTION

Figure 1:
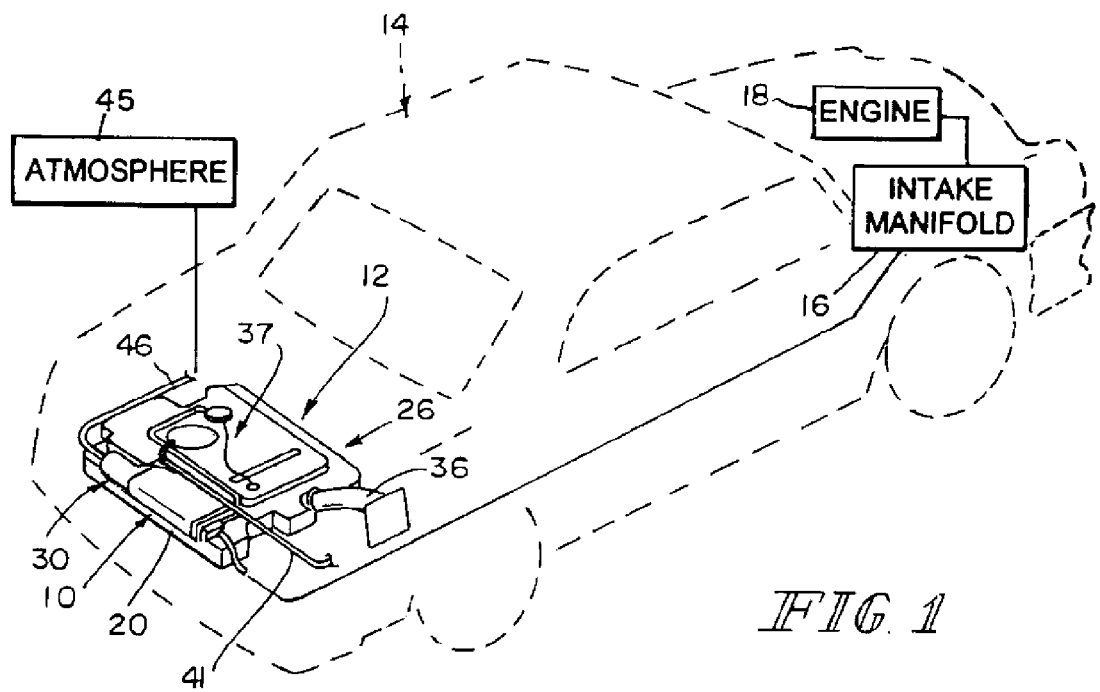
FIG. 1 is a perspective view of a portion of a vehicle fuel system in accordance with the present disclosure including a fuel tank having a filler neck and lying in a rearward portion of a vehicle (shown in phantom) and showing an intake manifold coupled by one conduit to an engine lying in a forward portion of the vehicle and by another conduit to a fuel vapor recovery canister included in the vehicle fuel system and mounted in an external canister-receiving cavity formed in the fuel tank.

A fuel vapor recovery canister 10 is included in a vehicle fuel system 12 associated with a vehicle 14 having an intake manifold 16 communicating with canister 10 and an engine 18 coupled to intake manifold 16 as suggested diagrammatically in FIG. 1. Canister 10 has a straight housing 20 containing first and second carbon beds 21, 22 and is sized to fit into an exterior canister-receiving cavity 24 formed in a fuel tank 26 included in vehicle fuel system 12 as suggested, for example, in FIGS. 1 and 2. Canister 10 is configured to "clean" fuel vapor 28 vented from fuel tank 26 during, for example, tank refueling as suggested diagrammatically in FIG. 4 and is "cleaned" or "purged" using a vacuum provided by intake manifold 16 when engine 18 is running as suggested diagrammatically in FIG. 5. A flow velocity increaser 30 is associated with second carbon bed 22 to increase velocity of atmospheric air and fuel vapor flowing through second carbon bed 22 toward first carbon bed 21 to hasten cleaning of canister 10 during a purge cycle shown diagrammatically in FIG. 5. Use of a retainer spreader 32 to compact carbon granules in first and second carbon beds 21, 22 to assume a desired density is shown diagrammatically in FIG. 6 and illustratively in FIG. 7. An illustrative embodiment of canister 10 is shown in FIGS. 3 and 8.

Figure 2:
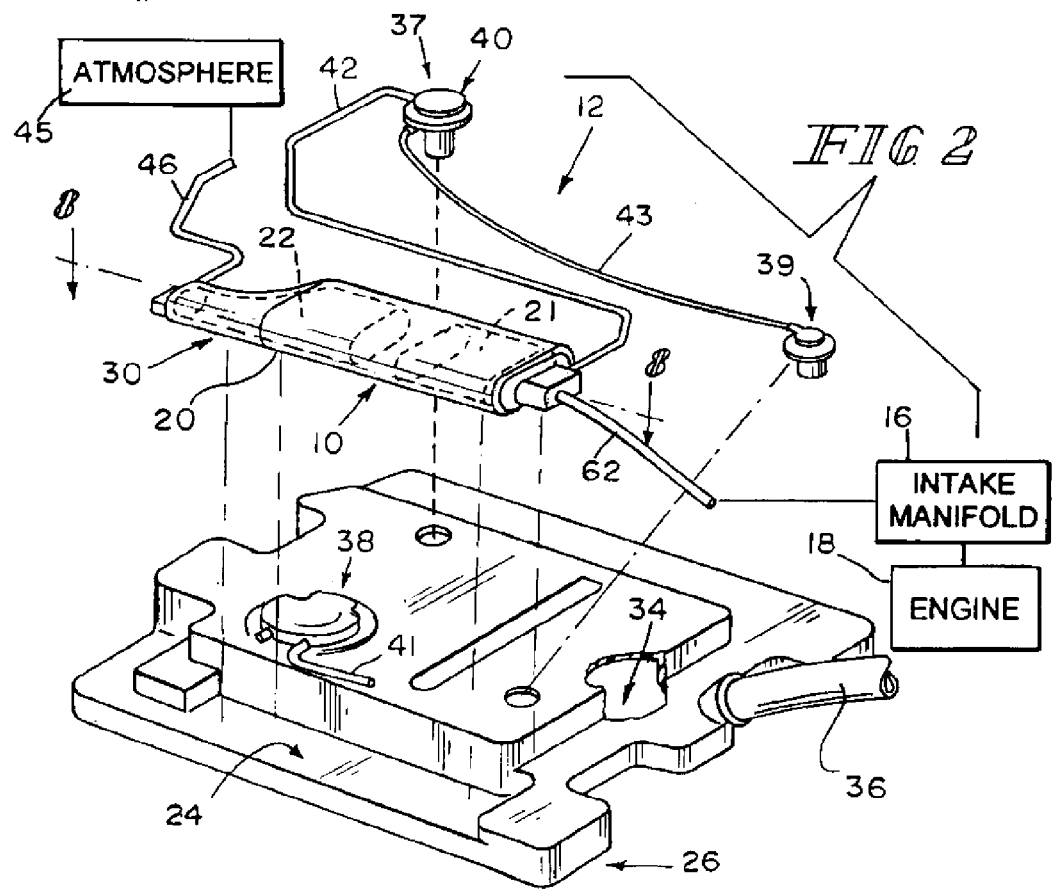
FIG. 2 is an enlarged, exploded perspective view of the vehicle fuel system portion of FIG. 1 showing the fuel vapor recovery canister containing two separate carbon beds (shown in phantom) in one "straight" housing and showing an external canister-receiving cavity formed on the underlying fuel tank to facilitate mounting of the straight two-bed housing in the external canister-receiving cavity.
Figure 3:
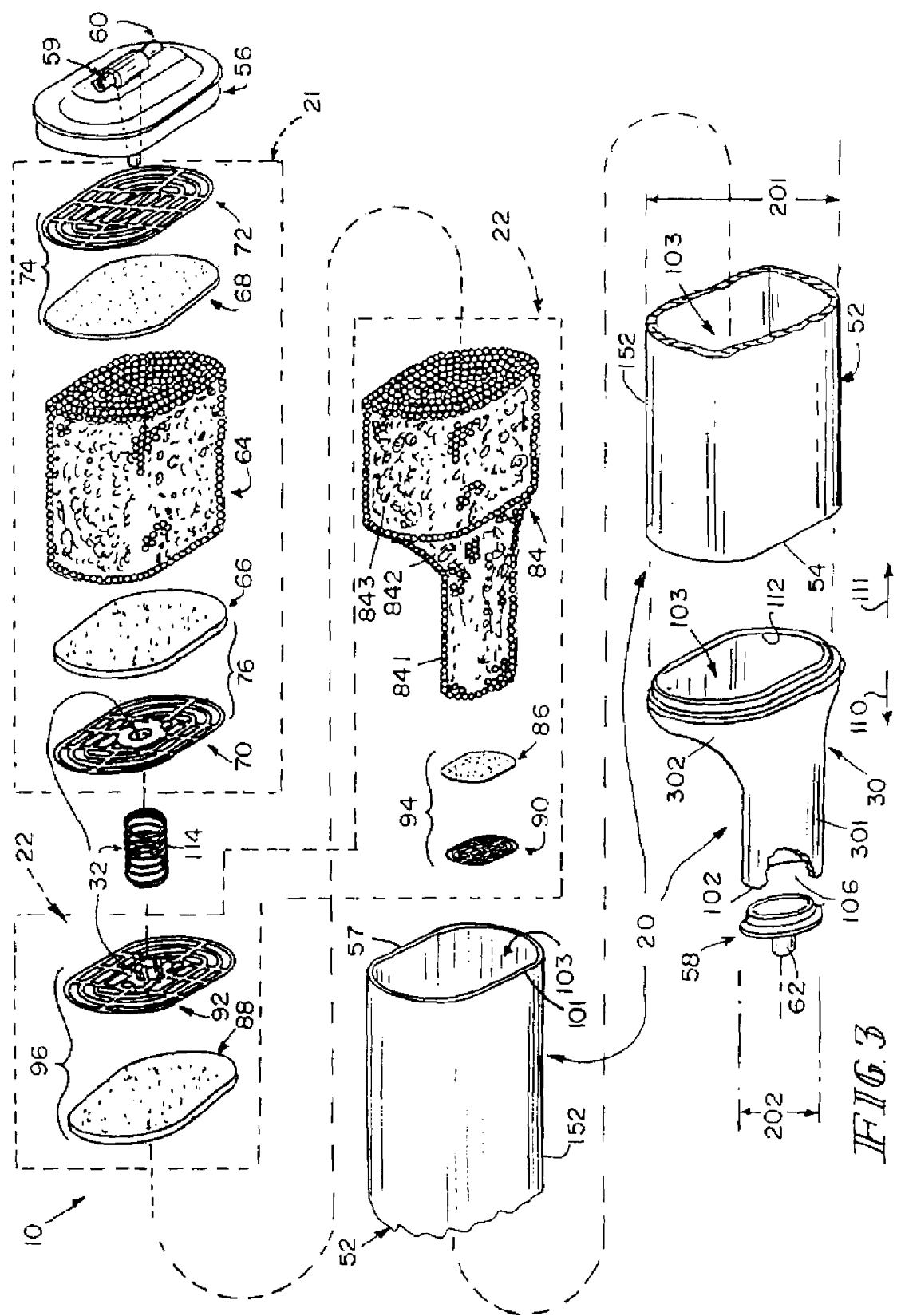
FIG. 3 is an exploded perspective assembly view of the fuel vapor recovery canister of FIGS. 1 and 2 showing two separate groups of carbon granules adapted to be loaded into an extruded tube (broken apart for illustrative purposes) having a generally straight side wall, an inlet cover formed to include a fuel vapor port and a vacuum port and adapted to be coupled to a right end of the tube, a funnel having a larger end adapted to be coupled to a left end of the tube (to form the straight two-bed housing) and an opposite smaller end, and an exit cover adapted to be coupled to the smaller end of the funnel and formed to include an air port and also showing two sets of filters and filter backing plates associated with each of the groups of carbon granules and configured to cooperate with the carbon granule groups to form the two separate carbon beds shown in FIG. 8.

As suggested in FIG. 2, fuel tank 26 is formed to include an interior fuel-storage region 34 and a filler neck 36 is coupled to fuel tank 26 and formed to conduct liquid fuel into interior fuel-storage region 34 during tank refueling activities. An exterior wall of fuel tank 26 is configured to define canister-receiving cavity 24 to enable a vehicle manufacturer to mount canister 10 in cavity 24 on that exterior wall so as to conserve space available in vehicle 14. Canister 10 includes two separate carbon beds 21, 22 and both of those beds 21, 22 are located in that exterior cavity 24 in fuel tank 24 as suggested, for example, in FIGS. 1 and 2. It is within the scope of this disclosure to vary the shape and size of fuel tank 26 and canister-receiving cavity 24 as needed to suit design needs associated with any particular vehicle.

Vehicle fuel system 12 also includes a fuel sender unit 38, a rollover valve (ROV) 39, and a fill-limit vent valve (FLVV) 40 as suggested in FIGS. 1 and 2. A conduit 41 is provided to conduct liquid fuel discharged from interior fuel-storage region 34 of fuel tank 26 by fuel sender unit 38 to engine 18. A conduit 42 carries fuel vapor vented by fill-limit vent valve 40 from interior fuel-storage region 34 of fuel tank 26 to canister 10 so that the fuel vapor can be passed through first and second carbon beds 21, 22 in a "vapor-cleaning" process. In addition, fuel vapor vented by rollover valve 39 from region 34 of fuel tank 26 can pass through a conduit 43 coupled to fill-limit vent valve 40 for delivery to canister 10 via conduit 42. It is within the scope of this disclosure to use any suitable systems of conduits and valves to produce a tank vent system 37 to conduct fuel vapor from fuel tank 26 to canister 10 to be cleaned as the fuel vapor passes through first and second carbon beds 21, 22.

In an illustrative embodiment, fuel tank 26, filler neck 36, and canister 10 are mounted in a rearward portion of vehicle 14 while intake manifold 16 and engine 18 are mounted in a forward portion of vehicle 14 as suggested in FIG. 1. In use, hydrocarbon material (not shown) entrained in fuel vapor discharged from fuel tank 26 and passed through first and second carbon beds 21, 22 is captured or stored (e.g., adsorbed) on charcoal granules included in carbon beds 21, 22. Therefore, hydrocarbon material is removed from fuel vapor as that fuel vapor passes through first and second carbon beds 21, 22 and a stream of cleaned vapor 44 is discharged from canister 10 to the atmosphere 45 via a conduit 46 during a vapor-cleaning process as suggested diagrammatically in FIG. 4.

In one illustrative embodiment suggested in FIGS. 3 and 8, fuel vapor recovery canister 10 includes an elongated housing 50 comprising a tube 52, a flow velocity increaser 30 coupled to one end 54 of tube 52, an inlet cover 56 coupled to another end 57 of tube 52, and an outlet cover 58 coupled to flow velocity increaser 30. Inlet cover 56 includes a fuel vapor port 59 coupled to conduit 42 to admit fuel vapor 28 discharged from fuel tank 26 into canister 10 during a tank-refueling cycle (as suggested in FIG. 4) and a vacuum port 60 coupled to a conduit 62 leading to intake manifold 16 to apply vacuum 15 provided via intake manifold 16 to passageways formed in tube 52 and flow velocity increaser 30 during a canister-purge cycle (as suggested in FIG. 5). Outlet cover 58 includes an air port 62 coupled to conduit 46 to discharge cleaned vapor 44 from canister 10 to atmosphere 45 during the tank-refueling cycle.

First carbon bed 21 comprises a first group of carbon granules 64, left and right filters 66, 68, and left and right filter backing plates 70, 72 as suggested in FIGS. 3 and 8. In an illustrative embodiment, first carbon bed 21 is contained inside tube 52 of elongated housing 20 as shown in FIG. 8. Right filter 68 and right filter backing plate 72 cooperate to form a first fixed granule retainer 74 coupled to tube 52. Left filter 66 and left filter backing plate 70 cooperate to form a first movable granule retainer 76 mounted for movement relative to tube 52. Retainer spreader 32 is used to move first movable granule retainer 76 relative to first fixed granule retainer 74 to compact or relax first group of carbon granules 64 located therebetween to select the density of carbon granules in first carbon bed 21. Some of those carbon granules contact an interior wall of tube 52.

Second carbon bed 22 comprises a second group of carbon granules 84, small and large filters 86, 88, and small and large filter backing plates 90, 92 as suggested in FIGS. 3 and 8. In an illustrative embodiment, second carbon bed 22 is contained inside flow velocity increaser 30 and a portion of tube 52 as shown in FIG. 8. Small filter 86 and small filter backing plate 90 cooperate to form a second fixed granule retainer 94 coupled to flow velocity increaser 30. Large filter 88 and large filter backing plate 92 cooperate to form a second movable granule retainer 96 mounted for movement relative to tube 52. Retainer spreader 32 is used to move second movable granule retainer 96 relative to second fixed granule retainer 94 to compact or relax second group of carbon granules 84 located therebetween to select the density of carbon granules in second carbon bed 22. Some of those carbon granules contact interior walls of flow velocity increaser 30 and tube 52. In the embodiment illustrated in FIGS. 3 and 8, second group of carbon granules 84 comprises an outer pack 841, an inner pack 843, and a middle pack 842 located between outer and inner packs 841, 843.

Figure 4:
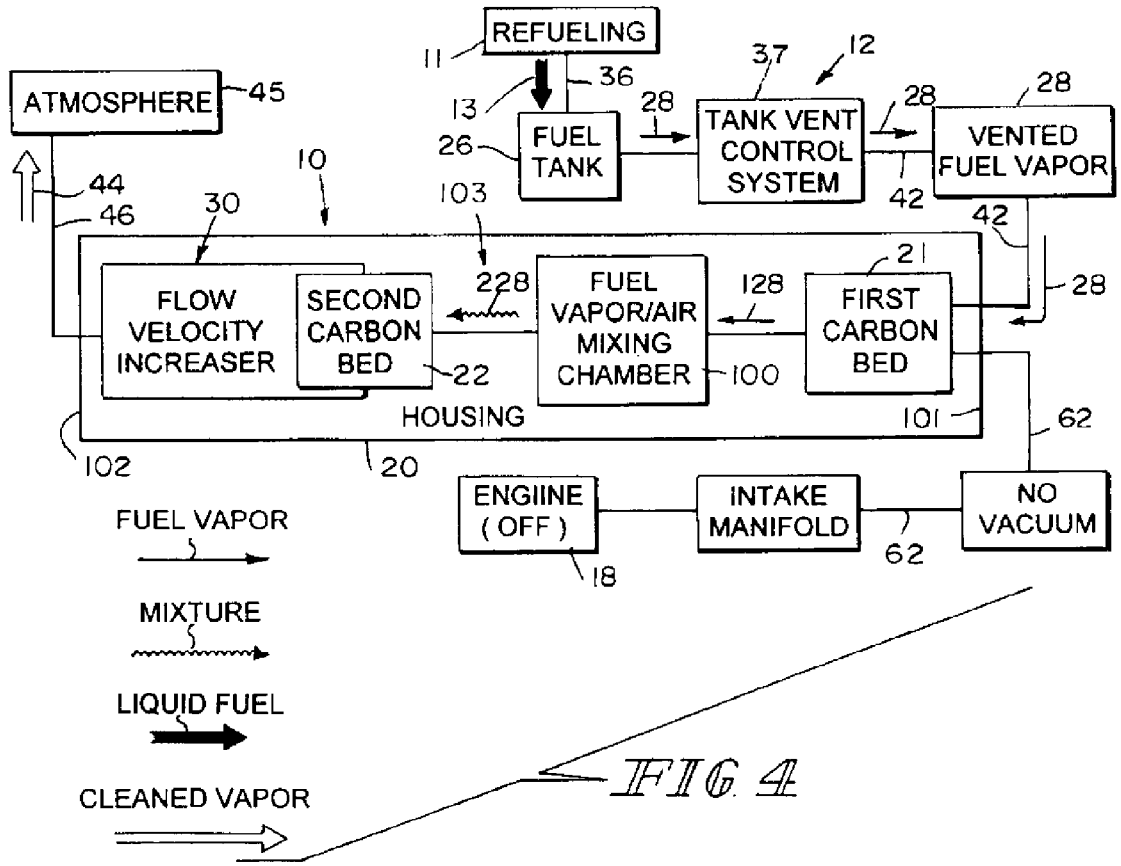
FIG. 4 is a diagrammatic view of the vehicle fuel system of FIGS. 1 and 2 showing generally laminar flow of vented fuel vapor from the fuel tank in the canister (during tank refueling) along a generally straight path through (1) a first carbon bed to cause a first group of hydrocarbons (HC) associated with the vented fuel vapor to be captured by the first carbon bed, (2) a fuel vapor/air mixing chamber to cause HC-depleted fuel vapor to mix with atmospheric air present in the mixing chamber, and (3) a separate second carbon bed to cause a second group of hydrocarbons associated with the mixture discharged from the mixing chamber to be captured by the second carbon bed and showing cleaned vapor discharged from the canister to the atmosphere.

Fuel vapor recovery canister 10 includes an elongated housing 20, a first carbon bed 21, and a second carbon bed 22 as suggested in FIGS. 4 and 8. Elongated housing 20 is formed to include an inlet end 101, an exit end 102, and an interior region 103 extending therebetween. First carbon bed 21 is located in interior region 103 and positioned to lie in close proximity to inlet end 101. Second carbon bed 22 is located in interior region 103 and positioned to lie in close proximity to exit end 102 and in spaced-apart relation to first carbon bed 21 to form a fuel vapor/air mixing chamber 100 interposed between first and second carbon beds 21, 22 as shown diagrammatically in FIGS. 4 and 5 and illustratively in FIGS. 7 and 8. Chamber 100 provides an equalizing function to allow carbon pack integrity of first and second carbon beds 21, 22 to be maintained and efficient use of a "bleed-loss" section in second carbon bed 22.

Fuel vapor admitted into elongated housing 20 through inlet end 101 and discharged from first carbon bed 21 is mixed with atmospheric air 49 provided in fuel vapor/air mixing chamber 100 to produce a flow of fuel vapor passing into and through second carbon bed 22 and flowing toward exit end 102. In the embodiment illustrated in FIG. 4, fuel vapor 28 is admitted into first carbon bed 21, a flow of "hydrocarbon-depleted" fuel vapor 128 is discharged into fuel vapor/air mixing chamber 100 to mix with air 49 present in chamber 100, a flow of fuel vapor 228 passes from chamber 100 into second carbon bed 22, and cleaned vapor 44 is discharged from second carbon bed 22 to atmosphere 45. Fuel vapor flowing through interior region 103 of elongated housing 20 passes through the porous filters 66, 68, 86, and 87 and through flow apertures formed in filter-backing plates 70, 72, 90, and 92.

Elongated housing 20 includes a generally straight side wall section 52 forming an outer boundary of fuel vapor/air mixing chamber 100 as shown, for example, in FIGS. 3 and 8. Generally straight side wall section 152 also surrounds first carbon bed 21 and at least a portion of second carbon bed 22 adjacent to fuel vapor/air mixing chamber 100. Each of first and second carbon beds 21, 22 comprises carbon granules arranged to contact generally straight side wall section 152 as shown best in FIG. 8. As fuel vapor flows through interior region 103 of elongated housing 20 during a tank-refueling cycle (as suggested in FIG. 4), hydrocarbon material entrained in that fuel vapor will be captured (e.g., adsorbed) on charcoal granules included in first and second carbon beds 21, 22 so that the vapor 46 discharged from canister 10 to atmosphere 45 at outlet end 102 is clean and relatively free of unwanted hydrocarbon material.

Generally straight side wall section 152 defines a tube 52 that has a first cross-sectional area 201 as suggested in FIGS. 3 and 8. Elongated housing 20 further includes a funnel configured to provide flow velocity increaser 30 and coupled to one end 54 of tube 52.

Funnel 30 includes a high-speed flow pipe 301 and a horn-shaped transition pipe 302. High-speed flow pipe 301 has an opened end 106 exposed to atmosphere 45 and a second cross-sectional area 202 that is relatively smaller than first cross-sectional area 201 of tube 52. Horn-shaped transition pipe 302 is arranged to interconnect high-speed flow pipe 301 and generally straight side wall section 152. Horn-shaped transition pipe 302 is shaped to converge in a direction 110 extending toward high-speed flow pipe 301 to cause, during a canister-purge cycle, a stream of fuel vapor, which stream flows in elongated housing 20 toward first carbon bed 21 and inlet end 101 in response to a vacuum 15 applied to interior region 103 of elongated housing 20 at inlet end 101, to flow (1) at a first velocity ($V_1$) in tube 52 defined by generally straight side wall 152 and (2) at a faster second velocity ($V_2$) in high-speed flow pipe 301 included in funnel 30 to hasten release of hydrocarbon material adsorbed on a portion of second carbon bed 122 located in high-speed flow pipe 301 into the stream of fuel vapor 160 flowing in elongated housing 20 toward first carbon bed 21 and inlet 101 as suggested in FIG. 5. This high-speed flow in funnel 30 accelerates the pace at which hydrocarbon material is purged from second carbon bed 22 and helps to minimize the amount of hydrocarbons that are stored in second carbon bed 22. The diameter reduction in funnel 30 provides a velocity increase per unit volume during a canister-purge cycle to enhance the purge capability of canister 10.

Second carbon bed 22 comprises carbon granules 84 deposited in each of high-speed flow pipe 301 and horn-shaped transition pipe 302. Second carbon bed 22 comprises an outer granule retainer 94 located in high-speed flow pipe 301, an inner granule retainer 96 located in a granule chamber formed in generally straight side wall section 152 and located between horn-shaped transition pipe 302 and fuel vapor/air mixing chamber 100, and carbon granules 84 trapped between outer and inner granule retainers 96, 94 and located in each of high-speed flow pipe 301, horn-shaped transition pipe 302, and the granule chamber.

First carbon bed 21 further includes a fixed granule retainer 74 coupled to generally straight wall section 152, a movable granule retainer 76 mounted for movement relative to generally straight wall section 152, and a first group of carbon granules 64 located in a space provided between fixed and movable granule retainers 74, 76. Fuel vapor-recovery canister 10 further includes a retainer spreader 32 located in interior region 103 of elongated housing 20 and arranged to urge movable granule retainer 76 toward fixed granule retainer 74 to compact first group of carbon granules 64 to assume a selected granule density. In an illustrative embodiment, retainer spreader 32 is located in fuel vapor/air mixing chamber 100.

Tube 52 has a first cross-sectional area 201 and contains first carbon bed 21 and an inner portion 843 of second carbon bed 22. High-speed flow pipe 301 has a smaller second cross-sectional area 202 and contains an outer portion 841 of second carbon bed 22. Horn-shaped transition pipe 302 is arranged to interconnect high-speed flow pipe 301 and tube 52 and diverge in a direction 111 extending toward tube 52 and to contain a middle portion 842 of second carbon bed 22. In an illustrative embodiment, high-speed flow pipe 301 and horn-shaped transition pipe 302 cooperate to form a monolithic funnel 30 having a narrow-mouth end 106 coupled to exit cover 58 and an opposite wide-mouth end 112 coupled to tube 52. During a canister-purge cycle suggested for example in FIG. 5, fuel vapor will flow through high-speed flow pipe 301 at a faster rate than through tube 52. Similarly, fuel vapor will flow through horn-shaped transition portion 302 at a rate faster than through tube 52 although at rates slower than the flow rate in high-speed flow pipe 301 owing to the steadily widening interior dimension of horn-shaped transition portion 302 in direction 111.

Retainer spreader 32 is arranged to urge first movable granule retainer 76 toward first fixed granule retainer 74 to compact first group of carbon granules 64 to assume a selected density and to urge second movable granule retainer 96 toward second fixed granule retainer 94 to compact second group of carbon granules 84 to assume the selected density. In this manner, carbon granules in both of first and second carbon beds will be packed to assume about the same density. In illustrative embodiments, retainer spreader 32 is arranged to lie between first and second movable granule retainer 76, 96. First and second carbon beds 21, 22 are arranged to lie in spaced-apart relation to one another to define a fuel vapor/air mixing chamber 100 therebetween containing retainer spreader 32.

Retainer spreader 32 comprises a compression spring 114 including a first end 116 abutting first movable granule retainer 76 and an opposite second end 118 abutting second movable granule retainer 96. In illustrative embodiments, compression spring 114 is coiled and formed to include a channel 120 extending from first movable granule retainer 76 to second movable granule retainer 96. Canister 10 further includes a spring mount 122 extending through channel 120. Spring mount 122 includes a second end 124 coupled to second movable granule retainer 96 and a first end 126 coupled to first movable granule retainer 76 to limit movement of second movable granule retainer 96 to a maximum distance 128 away from first movable granule retainer 76 and to allow movement of second movable granule retainer 96 toward first movable granule retainer 76. In illustrative embodiments, compression spring 114 is sized to urge second movable granule retainer 96 to assume maximum distance 128 away from first movable granule retainer 76.

Elongated housing 20 includes a funnel 30 including a high-speed flow pipe 301 formed to include exit end 102 and a horn-shaped transition pipe 301 coupled to high-speed flow pipe 301. A portion of the second group of carbon granules 84 is located in high-speed flow pipe 301 and horn-shaped transition pipe 302.

Second fixed granule retainer 94 is coupled to high-speed flow pipe 301 as shown, for example, in FIG. 8. Elongated housing 20 includes a tube 52 containing a remaining portion of second group of carbon granules 84. Second movable granule retainer 96 is mounted for movement in tube 52 relative to the second fixed granule retainer 94.

Fuel tank 26 is formed to include an interior fuel-storage region 34 and an exterior canister-receiving cavity 24. Elongated housing 20 is retained in exterior canister-receiving cavity 24. Canister 10 is configured to be received by cavity 24 so as to share and fit within the general external boundary of fuel tank 26 without protruding substantially beyond an exterior wall of fuel tank 26. Canister 10 has a slim design and a cross-sectional profile well-suited for compact mounting on exterior portions of fuel tanks. Canister 10 is packaged in close proximity to fuel tank 26 to minimize vapor conduit lengths so as to minimize manufacturing costs.

Elongated housing 20 includes a straight tube 52 containing first carbon bed 21, at least a portion of second carbon bed 22, and a fuel vapor/air mixing chamber 100. Elongated housing 20 further includes a funnel 30 coupled to straight tube 52 and configured to contain a portion of second carbon bed 22. Funnel 30 includes a high-speed flow pipe 301 formed to include exit end 102 and a horn-shaped transition pipe 302 coupled to high-speed flow pipe 301.

As suggested in FIG. 4, during a tank-refueling operation 11, fuel vapor 28 displaced by liquid fuel 13 entering fuel tank 26 through filler neck 36 flows through tank vent control system 37 into canister 10. This fuel vapor 28 flows through first carbon bed 21 and hydrocarbons associated with fuel vapor 28 are captured and retained by first carbon bed 21. Then, a fuel vapor 128 carrying fewer hydrocarbons passes into fuel vapor/air mixing chamber 100 to mix with air 49 present in chamber 100 (air 49 flows into mixing chamber 100 during normal engine operation as suggested in FIG. 5). A mixture 228 is discharged from chamber 100 and distributed generally evenly and uniformly across an inlet face of second carbon bed 22 so as to avoid "localized" concentration of fuel vapor and hydrocarbon deposits in second carbon bed 22 and therefore promote more efficient use of hydrocarbon capturing capabilities of second carbon bed 22. Mixture 228 flows through second carbon bed 22 and remaining hydrocarbons associated with mixture 228 are captured and retained by second carbon bed 22. A stream of cleaned vapor 44 is then discharged from canister 10 through conduit 46 to atmosphere 45.

Figure 5:
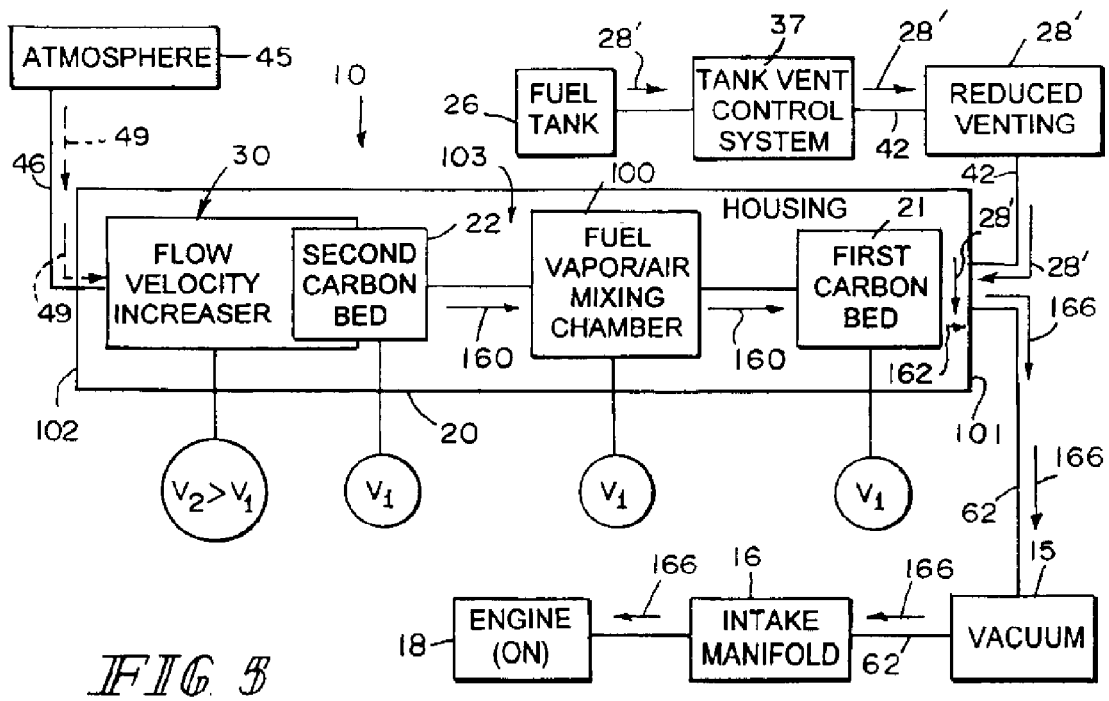
FIG. 5 is a diagrammatic view similar to FIG. 4 showing "purging" of the two separate carbon beds in the canister by means of a purge vacuum applied through a vacuum port in the inlet cover by the intake manifold when the engine is running (during normal vehicle operation) to cause fuel vapor (laden with hydrocarbons released from both of the first and second carbon beds) to move through the mixing chamber and the first carbon bed at a canister velocity ($V_1$) and to be discharged from the canister through a purge hose into the intake manifold for combustion in the engine and showing provision of a flow velocity increaser at a left end of the canister to provide means for using the purge vacuum to create a fast-moving stream of purge fuel vapor flow passing through an "upstream" portion of the second carbon bed at a higher intake velocity ($V_2$) to maximize cleanliness of that upstream portion.

As suggested in FIG. 5, when engine 18 is running, purge vacuum 15 is applied to interior region 103 of elongated housing 20 via intake manifold 16 and conduit 62. This vacuum 15 draws air 49 through a first portion 481, 483 of second carbon bed 22 in flow velocity increaser 30 (at a relatively high "intake" velocity $V_2$) and through a second portion of second carbon bed 22, fuel vapor/air mixing chamber, and first carbon bed 21 in tube 52 (at a slower "canister" velocity $V_1$). Hydrocarbons stored in second carbon bed 22 are reclaimed and entrained in fuel vapor 160 discharged from second carbon bed 22 into mixing chamber 100. This hydrocarbon-laden fuel vapor 160 passes into first carbon bed 21 and intercepts hydrocarbons stored in first carbon bed 21. Thus, hydrocarbons stored in first carbon bed 21 are reclaimed and entrained in fuel vapor 162 discharged from first carbon bed 21. During normal operation of engine 18, venting of a reduced volume of fuel vapor 28' from fuel tank 26 through tank vent control system 37 can occur to reduce unwanted fuel vapor pressure in fuel tank 26. Such vented fuel vapor 28' mixes with fuel vapor 162 discharged from first carbon bed 21 in a plenum 164 provided at inlet end 101 of elongated housing 20 to generate a fuel vapor mixture 166 that is discharged through conduit 62 to intake manifold 16 to be burned in engine 18 as suggested in FIG. 5.

As shown, for example, in FIG. 8, inlet cover 56 includes an outer shell 168, a port fixture 170 formed to include fuel vapor port 59 and vacuum port 60, and a standoff 172 appended to an interior wall of port fixture 170 and arranged to extend in direction 110 through plenum 164 to contact right filter backing plate 72 of first carbon bed 21. An outer rim 174 of outer shell 168 mates with an interior wall of tube end 57 and plenum 164 is bounded, in part, by right filter backing plate 72 and outer shell 168.

It should be noted that fuel vapor recovery canister 10 is well-suited to be manufactured by an extrusion process and laser welding. For example, tube 52 may be formed from a suitable extruded plastics material. Because tube 52 is extruded, its length may be adjusted by the cutoff extrusion and may be determined based upon operational requirements of a particular vehicle application to minimize tooling costs for larger canisters. Funnel 30, inlet cover 56, and exit cover 58 may be laser welded to tube 52 to hermetically seal seams between tube 52 and funnel 30, inlet cover 56, and exit cover

58. Tube 52 is generally straight and houses two separate carbon beds 21, 22. Canister 10 readily accommodates features for vapor-conduit retention and routing, as well as heat-shield attachments and leak-detection devices.

The invention claimed is:

1. A fuel vapor recovery canister comprising
an elongated housing having a length and formed to include an inlet end, an exit end, and an interior region extending therebetween,
a vapor-cleaning material located in the interior region, wherein the elongated housing includes a high-speed flow pipe and a tube that has a first cross-sectional area, the high-speed flow pipe has an opened end exposed to the atmosphere and a second cross-sectional area that is relatively smaller than the first cross-sectional area to cause a stream of fuel vapor flowing in the interior region of the elongated housing toward the inlet end in response to a vacuum applied to the interior region of the elongated housing at the inlet end to flow at a first velocity in the tube and at a faster second velocity in the high-speed flow pipe to hasten release of hydrocarbon material adsorbed on a portion of the vapor-cleaning material located in the high-speed flow pipe into the stream of fuel vapor flowing in the tube toward the inlet end, and
wherein the exit end includes a conduit extending generally in the direction of the length of the housing for providing flow into and out of the exit end.

2. The canister of claim 1, wherein the elongated housing further includes a horn-shaped transition pipe arranged to interconnect the high-speed flow pipe and the tube and to converge in a direction extending toward the high-speed flow pipe.

3. The canister of claim 1, wherein another portion of the vapor-cleaning material is deposited in each of the horn-shaped transition pipe and the tube.

4. The canister of claim 1, wherein the elongated housing further includes a transition pipe arranged to interconnect the high-speed flow pipe and the tube and the high-speed flow pipe and the transition pipe cooperate to define a funnel coupled to the tube.

5. The canister of claim 4, wherein another portion of the vapor-cleaning material is deposited in each of the transition pipe and the tube.

6. The canister of claim 1, wherein the vapor-cleaning material comprises carbon granules.

7. A fuel vapor recovery canister comprising
an elongated housing formed to include an inlet end, an exit end, and an interior region extending therebetween,
a vapor-cleaning material located in the interior region, wherein the elongated housing includes a tube having a first cross-sectional area and containing an inner portion of the vapor-cleaning material and a high-speed flow pipe having a smaller second cross-sectional area than the first cross-sectional area and containing an outer portion of the vapor-cleaning material and
wherein the housing has an inlet end wall at the end of the length of the housing and the inlet end wall includes an opening for providing flow into and out of the inlet end.

8. The canister of claim 7, wherein the elongated housing further includes a horn-shaped transition pipe arranged to interconnect the high-speed flow pipe and the tube and diverge in a direction extending toward the tube and also arranged to contain a middle portion of the vapor-cleaning material that is interposed between the inner and outer portions of the vapor-cleaning material.

9. The canister of claim 8, wherein the high-speed flow pipe and the horn-shaped transition pipe cooperate to form a monolithic funnel having a narrow-mouth end configured to form the exit end and an opposite wide-mouth end coupled to the tube.

10. The canister of claim 7, wherein the vapor-cleaning material comprises carbon granules.

11. A fuel vapor recovery canister comprising
an elongated housing formed to include an inlet end, an exit end, and an interior region extending therebetween,
a vapor-cleaning material located in the interior region, wherein the elongated housing includes a straight tube containing a first portion of the carbon granules and a funnel coupled to the straight tube and configured to contain a second portion of the carbon granules, the funnel includes a high-speed flow pipe formed to include the exit end and a horn-shaped transition pipe coupled to the high-speed flow pipe, and the second portion of the carbon granules is located in both of the high-speed flow and horn-shaped transition pipes of the funnel, and
wherein the housing has a tubular noncircular shape.

12. A fuel vapor recovery canister comprising
an elongated housing comprising a tube having a length, a flow velocity increaser coupled to one end of the tube, an inlet cover coupled to another end of the tube and formed to include an inlet, and an outlet cover formed to include an outlet and coupled to the flow velocity increaser to locate the flow velocity increaser between the outlet cover and the tube,
a vapor-cleaning material located in the tube and in the flow velocity increaser, wherein the flow velocity increaser is configured to provide means for causing a stream of fuel vapor flowing in the tube toward the inlet in response to a vacuum applied to the tube at the inlet to flow at a first velocity in the tube and at a faster second velocity in the flow velocity increaser to hasten release of hydrocarbon material adsorbed on carbon granules located in the flow velocity increaser into the stream of fuel vapor flowing in the tube toward the inlet and
wherein the housing has a tubular noncircular shape with a first port at the inlet and a second port at the exit and wherein the first and second ports each have an axis extending through the port center and extending generally along the length of the housing and wherein the axes of the first and second ports are not colinear such that the ports are offset from each other at the respective inlet and exit.

13. The canister of claim 12, wherein the tube has a first cross-sectional area and the flow velocity increaser includes a high-speed flow pipe having a second cross-sectional area that is smaller than the first cross-sectional area.

14. The canister of claim 13, wherein the flow velocity increaser further includes a transition pipe arranged to interconnect the high-speed flow pipe and the tube and diverge in a direction extending toward the tube.

15. The canister of claim 12, wherein the flow velocity increaser includes a horn-shaped transition pipe coupled to the tube.

16. The canister of claim 12, wherein the vapor-cleaning material comprises carbon granules.

17. A fuel vapor recovery canister comprising
an elongated housing having a length and formed to include an inlet end, an exit end, and an interior region extending therebetween, a vapor-cleaning material located in the interior region, wherein the elongated housing includes a high-speed flow pipe and a tube that has a first cross-sectional area, the high-speed flow pipe has an opened end exposed to the atmosphere and a second cross-sectional area that is relatively smaller than the first cross-sectional area to cause a stream of fuel vapor flowing in the interior region of the elongated housing toward the inlet end in response to a vacuum applied to the interior region of the elongated housing at the inlet end to flow at a first velocity in the tube and at a faster second velocity in the high-speed flow pipe to hasten release of hydrocarbon material adsorbed on a portion of the vapor-cleaning material located in the high-speed flow pipe into the stream of fuel vapor flowing in the tube toward the inlet end, and wherein the tube has a generally constant cross section along its length and the flow pipe extends from the exit end of the tube beginning with a decreasing cross sectional portion and ending with a constant cross sectional portion and wherein the center of the constant cross sectional portion is offset from the cross section of the tube.

\* \* \* \* \*